United States Patent [19]

Thomas

[11] Patent Number: 4,600,921
[45] Date of Patent: Jul. 15, 1986

[54] FULL-FIELD TELETEXT SYSTEM WITH DYNAMIC ADDRESSABILITY

[75] Inventor: William L. Thomas, Libertyville, Ill.

[73] Assignee: Zenith Radio Corporation, Glenview, Ill.

[21] Appl. No.: 543,588

[22] Filed: Oct. 19, 1983

[51] Int. Cl.[4] .......................... H04Q 9/00; H04N 7/18
[52] U.S. Cl. ............................ 340/825.31; 340/825.54; 358/84; 455/2
[58] Field of Search ....................... 340/825.31, 825.54, 340/825.52; 358/84–86, 114; 455/2, 4, 28; 179/2 A, 2 N; 375/2.1

[56] References Cited

U.S. PATENT DOCUMENTS 4,225,884  9/1980  Block et al. ............................ 358/84
4,484,217  11/1984 Block et al. ............................ 358/84
4,533,948  8/1985  McNamara et al. ................... 358/86

Primary Examiner—Donald J. Yusko

[57] ABSTRACT

The present invention permits a teletext system operator to adjust subscriber access to service levels individually by adjusting a code at the head end station. A head-end station transmits a tier description page and a tier authorization page. The tier description page divides the data base into a group of tiers each comprising a defined range of pages. The authorization page lists authorization codes for all subscribers, one code per subscriber. Each subscriber station includes a permanent location code. When access is requested by the subscriber, the subscriber station uses the location code to acquire the authorization code transmitted by the head-end station. The authorization code indicates which tiers the subscriber station may decode. To change the service, the system operator may change the authorization codes at the head-end station or change the range definitions for the service level tiers.

21 Claims, 7 Drawing Figures

| | | | | | | | | | |
|---|---|---|---|---|---|---|---|---|---|
| ROW 0 | CLK | CLK | FC | MAG. AND ROW ADD. | PAGE NO. | TIME | CTL A | CTL B | .... |
| ROW 1 | CLK | CLK | FC | MAG. AND ROW ADD. | TIER 0 PAGE ADDRESS RANGE | | TIER 1 PAGE ADDRESS RANGE | | .... |
| • | | | | | | | | | |
| • | | | | | | | | | |
| • | | | | | | | | | |
| • | | | | | | | | | |
| ROW 23 | CLK | CLK | FC | MAG. AND ROW ADD. | TIER n-1 PAGE ADDRESS RANGE | | TIER n PAGE ADDRESS RANGE | | .... |

TIER AUTHORIZATION PAGE    FIG. 4

| | | | | | | | | | |
|---|---|---|---|---|---|---|---|---|---|
| ROW 0 | CLK | CLK | FC | MAG. AND ROW ADD. | PAGE NO. | TIME | CTL A | CTL B | |
| ROW 1 | CLK | CLK | FC | MAG. AND ROW ADD. | SUB. 0 TIER AUTH. CODE | | SUB. 1 TIER AUTH. CODE | | |
| • | | | | | | | | | |
| • | | | | | | | | | |
| • | | | | | | | | | |
| • | | | | | | | | | |
| ROW 23 | CLK | CLK | FC | MAG. AND ROW ADD. | SUB. m-1 TIER AUTH. CODE | | SUB. m TIER AUTH. CODE | | |

FIG. 5        INTERNALLY GENERATED ←→ TRANSMITTED

FULL-FIELD TELETEXT SYSTEM WITH DYNAMIC ADDRESSABILITY

BACKGROUND OF THE INVENTION

The present invention relates generally to teletext communications systems and particularly to the addressability of service levels, also called tiers, in a teletext data base. The present invention provides dynamic addressability to permit the system operator to adjust the tiers to which an individual, remotely located subscriber can have access and without requiring changes at the remote subscriber location.

Teletext as a television based communication technique for the transmission of text and graphics information has been an acknowledged, operational technique for some years now. Originally, systems implemented a teletext feature by transmitting text and graphics material in digitally encoded form on only a few lines of a multi-line system. For example, the British teletext system transmitted such material only on lines 17, 18, 330 and 331 of their 625 line system. At each receiving end, a television receiver is equipped with a teletext decoder to process the data and form a display on the viewing screen.

In the typical teletext system, the broadcast teletext information is formatted ina group of cyclically transmitted rows of data, twenty four rows comprising a page of information. In many of the systems currently in use, each group of one hundred pages is separately identified as a magazine. Each row of information, which represents up to 40 characters of text or graphic data, is serially transmitted in digitally encoded form on one horizontal line. In early teletext systems this was sent only in the vertical blanking interval so that the data transmission rate was in the neighborhood of only 2 rows per field or four pages per second. With such systems, it was customary to limit the cyclically transmitted data to 200 pages so as to provide reasonable access time.

With the advent of cable television systems it has become practical to transmit full-field teletext, i.e. a system which does not limit its teletext data transmission to the vertical interval. A full field system thus can carry essentially only teletext data, together with supporting NTSC or other signals. In a full-field teletext system, transmission rates of 500 pages per second can be easily achieved with a 40 character, 24 row page display format. This allows an expanded data base of at least 5000 pages with an average access wait-time of about 5 seconds.

Typically each teletext decoder located at a subscriber station includes a data acquisition circuit responsive to user (subscriber) commands for acquiring a selected page of the recycling teletext information and for storing the twenty four rows of digitally encoded data comprising the page. The stored encoded data is then applied to a display generator which decodes the stored information for synthesizing R, G, B video character signals which are coupled to and drive the cathode ray tube (CRT) of the television receiver for producing a display corresponding to the stored data, the display comprising a page of twenty four rows of text or graphics with each row consisting of up to 40 characters.

In such a system, the first row (row 0) of each page is referred to as a page-header and includes an encoded magazine and page number as well as a row address. The remaining rows include only magazine and row address but no page number codes. Acquisition of a selected page of data is therefore achieved in the teletext decoder by initially matching the magazine and page number codes of a transmitted page-header row with user selected magazine and page number codes and then storing such matching page-header row together with the twenty three rows containing the corresponding magazine.

In this regard, it is to be appreciated that the data acquisition process cannot be completed until a match is achieved between the magazine and page number codes of a received page-header row and the magazine and page number codes selected by the user of the teletext decoder. The data acquisition time, i.e. the time between the selection by a viewer of a desired page and the presentation thereof on the screen of the receiver, is therefore dependent upon the relative position of the selected page in the cyclical transmission at the time the viewer enters the corresponding magazine and page number codes. This waiting period is appreciably shorter on the full-field system than in the previous systems.

In a modification to use a cable television system, it is desirable to present to all subscribers of the cable system a wide ranging data base divided into a number of service levels (tiers) covering various consumer interest areas, e.g., news, weather, sports, entertainment, professional information, home and auto repair, business information, television guides, advertising, health and medical information, etc. Subscribers pay a fee corresponding to the service level they want to decode, so it is desirable to be able to control separately each user's access to the various tiers.

One technique for accomplishing this selective viewing, or addressability of programming as it is commonly known, is described in U.S. Pat. No. 4,393,404 by Charles M. Cox and William Thomas, issued July 12, 1983, owned by Zenith Radio Corporation, the assignee of the present invention, the disclosure of which is incorporated herein by reference. In that technique, a novel data decoder is used to allow the subscriber who possesses it to view special services which are not available to the general receiving public. Although this technique is directed toward limited line teletext systems, it is illustrative of the typical scheme used to selectively address particular portions of the teletext data base.

There is a drawback to the type of addressing used in the above-cited example. Particularly, one must change the decoder of the subscriber station in order for that subscriber to alter his service tier access.

It would be desirable from both a cost effectiveness point of view and from a convenience point of view if the system operator could permit selected subscriber to gain access to additional tiers without the cost and trouble of modifying equipment already located at the remote subscriber station. Consequently, a provision in a teletext system for head-end (transmitting station) control of tier accessability would be beneficial if such accessibility control (addressing) were to have dynamic capabilities so as not to require reprogramming of the subscriber equipment or even any change in permanent coding status for that subscriber.

It is therefore a basic object of the present invention to provide dynamic addressability capabilities in an improved teletext system useful in full-field or other teletext systems, so as to allow selective controlled access to a tiered teletext data base for each subscriber of a cable television system.

It is a further object of the invention to allow additional accessibility to paying subscribers by redefining the range of material in any particular tier to which that subscriber already has access.

Another object of the invention is to provide for head-end, redefinition of the appropriate tier without any changes at the subscriber station.

BRIEF DESCRIPTION OF THE DRAWINGS

The features of the present invention which are believed to be novel are set forth with particularity in the claims. The invention, together with its objects and the advantages thereof, may best be understood by reference to the following description taken in conjunction with the accompanying drawings, in which like reference numerals identify like elements in the several figures and in which:

DESCRIPTION OF THE PREFERRED EMBODIMENT

Figure 1:
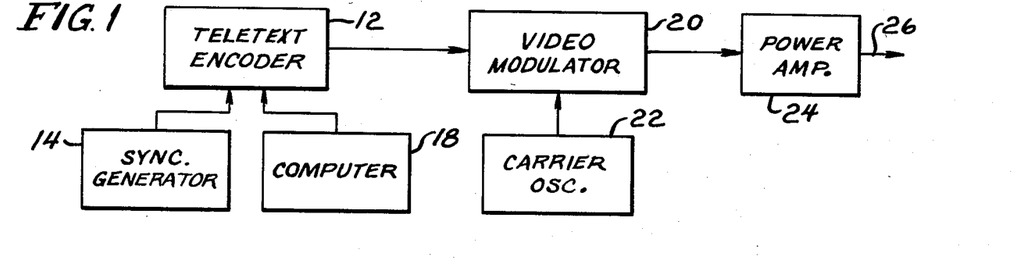
FIG. 1 is a general block diagram showing the video portion of a cable television transmitting (head end) station inlcuding a teletext encoder.
Figure 2:
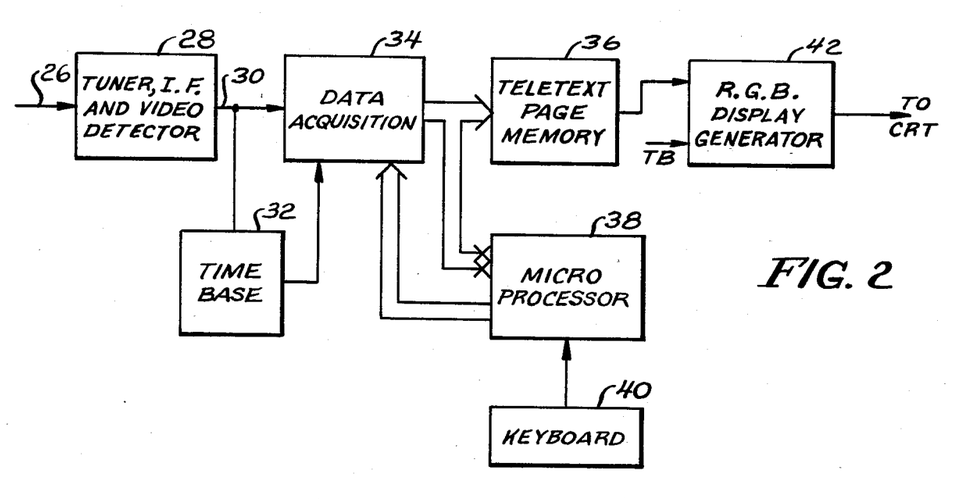
FIG. 2 is a general block diagram showing a typical subscriber station in a cable television system including a teletext decoder.

For purposes of description, the concepts of the present invention will hereinafter be described in terms of a typical cable television communication system capable of transmitting full-field teletext as generally shown in FIGS. 1 and 2. It will be appreciated, however, that this exemplary description is in no way intended to limit the scope of the invention which, in general, may be practiced with any teletext communication system wherein digitally encoded data is transmitted from time to time on a channel. Thus, numerous changes, e.g. number of data rows per page, number of characters per row, etc., may be made in the system parameters without affecting the scope or utility of the invention.

In particular, the system envisioned for descriptive purposes herein is a full-field teletext system having a 5000 page data base. This data is cyclically transmitted to provide access to any particular page with an average wait period of only 5 seconds. Normally, the entire data base will be transmitted in about 10 seconds with full-field transmission. Each page comprises approximately 20 to 24 rows of 40 characters each. Typically, each character could be based on 7 bits of data in normal page reception modes. FIG. 1 shows a block diagram of a conventional head-end teletext encoder arrangement for a cable television system which can be used for full-field transmission. It is designed in a conventional fashion to continually transmit the entire teletext data base cyclically without any direct operation of the illustrated computer. Rather, an encoder works directly with a memory store to accomplish the cyclical transmission in known fashion.

However, while the entire data base is transmitted every 10 seconds, it is desirable to transmit some special control pages more frequently. These should be transmitted often enough to require only a 1 to 2 second user wait period at any subscriber station. As set forth infra, these control pages will comprise a tier description page, a series of subscriber tier authorization code pages, and system status pages. Of these, only the tier description page and the subscriber tier authorization pages are central to the illustrative embodiment of the invention. Thus, only they will be described more fully below in connection with the discussion of FIGS. 3 and 4 and the operation of the subscriber station shown in FIG. 6.

The other pages would normally include such pages as a system welcome message page, system instructions or any other similar pages designed to make the system more attractive to the user. Essentially, it is for convenience sake that these pages are transmitted more frequently.

This special transmission may be done in a number of ways. One such way is to store these special pages at appropriate points throughout the teletext data base. Another way is to use the computer to interrupt the normal data transmission at the appropriate times and insert these special pages into the transmission flow. A third and favored way is to devote a specific number of transmission lines to these purposes and feed this data from a separate controller. Any of these methods would be effective to accomplish the desired object of shortening userwait periods at such times when the user initiates a system request.

However, even though the more frequent transmission of these special pages is desired to enhance user convenience, it is not required for effective operation of the invention but does represent one modification in the preferred embodiment. All that is required for the preferred embodiment of this invention is that the tier description page and the subscriber tier authorization pages be transmitted from time to time, preferably cyclically, along with the remainder of the data base.

FIG. 1 illustrates that no special hardware is necessary for implementation of the present invention. Further, the interconnection between the elements of FIG. 1 is entirely conventional as are the elements themselves. Teletext encoder 12 develops an appropriately band limited, digitally encoded, serial data signal on all or substantially all of the active horizontal lines of the video signal channel. This is in response to controlling actions of the computer 18 and sync generator 14. This video signal is subsequently coupled from teletext encoder 12 to a video modulator 20 for amplitude modulation of a carrier signal developed by carrier oscillator 22, the resulting amplitude-modulated signal being amplified by a power amplifier 24 for transmission via line 26.

Figure 5:
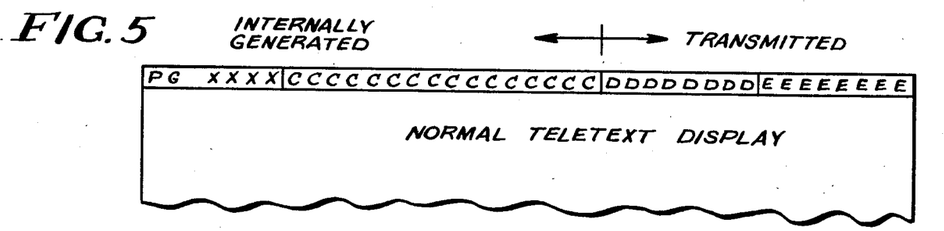
FIG. 5 is an illustration of a normal teletext data page showing the page header.

The teletext encoded data transmitted on the active lines of a video channel is decoded to display a normal page the format of which is illustrated in FIG. 5. Typically, this comprises a page header (row 0) which is responsible for display organization and remaining rows which can have any desired information content. The most important function of the page header is to identify the displayed or requested page by page number. The remaining bytes of the page header can be used for internal message generation and date, time or system identification or any other desired purposes. Typical of one possible page format is that described in U.S. Pat. No. 4,393,404 which would be compatible with the envisioned system of the present invention, although it may be simplified for use in a full-field teletext system.

Again, a row of teletext data is transmitted on each active line of the video channel. The rows are transmitted one after another in cyclical fashion so that a 5000 page data base may be transmitted typically in about 10 seconds. A viewer may acquire and display any selected page of the cyclically transmitted data base, the acquisition time of the selected page depending upon the relative timing between the viewer's request and the position of the desired page within the data base transmission interval. On the average, the acquisition time will be about 5 seconds in the invented system. However, acquisition of any page for a particular viewer will depend upon access authorization to that page for that viewer which is governed by the dynamic addressability of the present invention. Once an authorized page is acquired, it will be displayed on the subscriber's television screen in the form of 20 to 24 rows of characters. The first row, the page-header, contains the page number and whatever additional information is desired, and each remaining row contains the characters of the teletext data transmitted during the corresponding data line.

A television receiver including a conventional teletext decoder for acquiring and displaying a selected page of the cyclically transmitted teletext data base is illustrated in FIG. 2. The television receiver includes a tuner, IF amplifier, and video detector stage 28 which converts the signal received on line 26 into a base band signal on an output conductor 30 which supplies a time base circuit 32 and a data acquisition circuit 34. In the configuration shown, time base 32 enables data acquisition circuit 34 to compare authorized page numbers received from microprocessor 38 with the page numbers of each received page header row. Once data acquisition circuit 34 acquires the data page matching the requested page number, that page is coupled for storage in teletext page memory 36 by microprocessor 38. In this scheme, microprocessor 38 is responsive to keyboard 40 to initiate the acquisition of the desired page.

The output of teletext page memory 36 is coupled to RGB display generator 42 which is enabled by time base circuit 32. RGB display generator 42 converts the encoded character bytes from the teletext page memory 36 to the so-called R, G and B (red, green and blue) signals, which may be thought of as internally synthesized video signals suitable for driving the CRT (not shown) for displaying the full page (20–24 rows) of text or graphics represented by the encoded character bytes.

The present invention adds to the abovedescribed scheme the unique feature of dynamic addressibility. This is facilitated by the transmission of control pages along with the teletext data base. As mentioned previously there are a number of control pages which can be used in conjunction with the full-field teletext system; the most important of these, and the ones crucial to the operation of this embodiment of the invention, are the tier description page and the subscriber tier authorization code pages.

Figure 3:
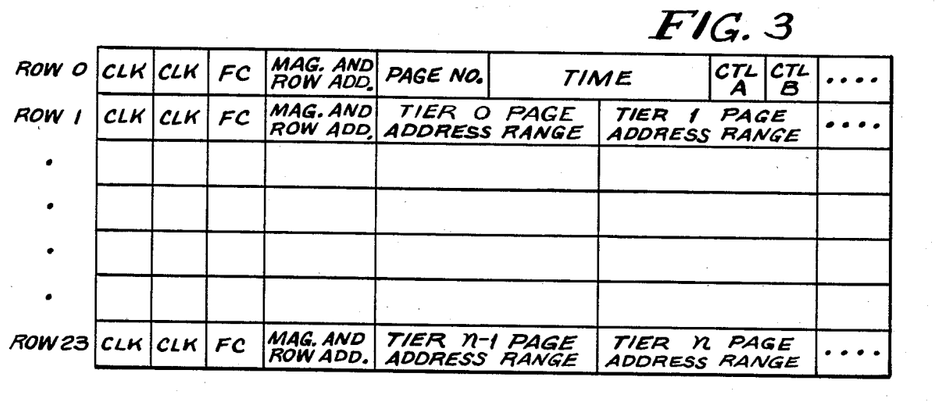
FIG. 3 is an illustration of a tier description page showing a typical layout and location of relevant tier information.

FIG. 3 illustrates a tier description page. Generally, it shows the page layout and the location of relevant tier information, particularly the beginning and end pages of each tier. This is the information which is of the greatest concern to the present invention and is labelled in FIG. 3 as Tier 0 Page Address Range, Tier 1 Page Address Range, and so on.

Figure 4:
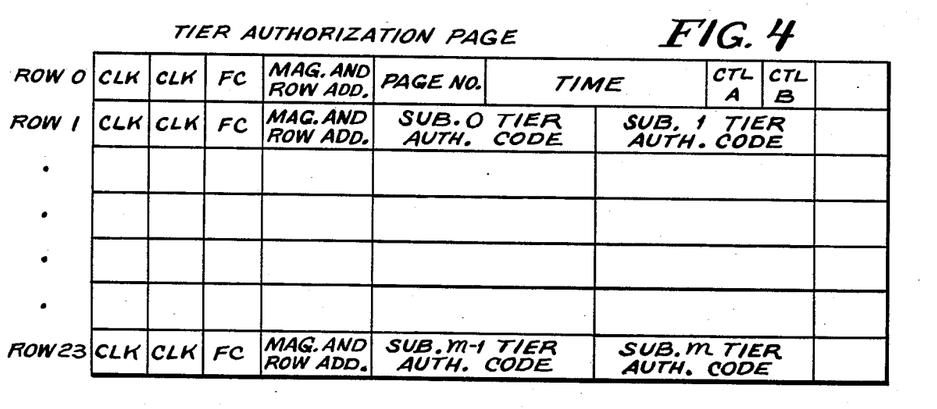
FIG. 4 is an illustration of a subscriber tier authorization page showing a typical layout and the location of particular subscriber authorization codes.

FIG. 4 illustrates a subscriber tier authorization page. The page shown is a representative page for use in a full-field teletext system utilizing the present invention. The tier authorization page contains a normal page header in row 0 followed by a full page of rows containing tier authorization codes for particular subscribers. Each such page contain approximately twenty rows of authorization codes, each having five separate subscriber codes, thus providing for approximately one hundred customers per tier authorization page. In a system having 10,000 subscribers, only about 100 pages would be required to store an individual tier authorization code for each subscriber.

Each subscriber's tier authorization code contains 40 bits illustratively. This allows the system to have up to 40 separate tiers or service level programs which can be selectively addressed to individual subscribers based on the status of a particular bit within that subscriber's tier authorization code. In operation, each bit of the subscriber's tier authorization code corresponds to a particular tier or program in the teletext data base. If a bit is in the one state, i.e. high or flagged, that subscriber will be allowed access to the corresponding range of pages contained by that tier within the teletext data base. If the bit is in the zero state, that subscriber has not been authorized to view the contents of that tier and will be accordingly denied access thereto.

The location of each subscriber's tier authorization code within the series of tier authorization pages is determined by assigning each subscriber a particular code number which is used to locate a corresponding authorization code transmitted from the head-end station. Thus, the subscriber's location code number specifies the page and the row on that page in which the subscriber's authorization code can be found. It also specifies which of the five customer codes in that particular row is the one corresponding to the subscriber.

For example, in a system having a typical number of 100 subscriber codes per page, subscriber No. 5,368's authorization code would be on the fifty-third page of the tier authorization pages. Further, it would be in the fourteenth row and would be the third customer in that row. Similarly, any other location-coding scheme might work equally well in the present invention; this one is given merely for exemplary purposes.

Figure 6:
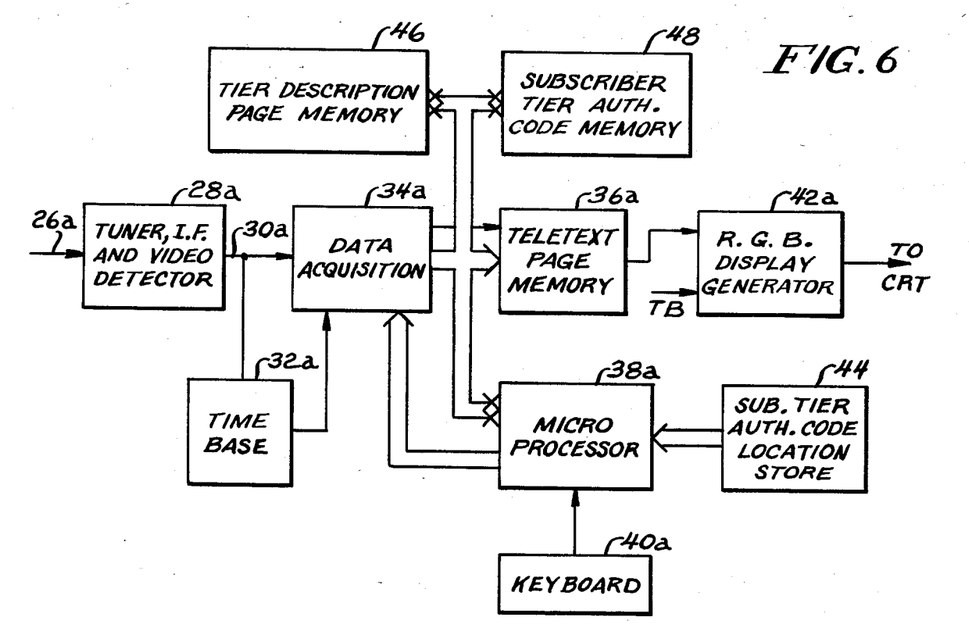
FIG. 6 is a general block diagram showing a typical subscriber station in a cable television system which has been modified to be compatible with the dynamic addressability provisions of the invention.

FIG. 6 is a block diagram of a subscriber's receiving station in a cable television system which has been modified so as to be compatible with the dynamic addressability of the present invention. In most respects this station is identical to the normal receiving station as was described above in conjunction with FIG. 2. The station has a stage 28a including a tuner, IF amplifier, and video detector. Stage 28a has its input coupled to transmission line 26a and its output on line 30a coupled to a data acquisition circuit 34a and a time base 32a. A microprocessor 38a is responsive to input requests from a keyboard 40a and is effective to control data acquisition circuit 34a and to update a teletext page memory 36a. An RGB display generator 42a is coupled at its input to teletext page memory 36a and at its output to a CRT display (not shown) while receiving timing information from time base circuit 32a. The interconnections and operations of these elements are substantially identical to their correspondingly numbered counterpart elements in FIG. 2 and will not be described again at this point except to explain the interaction between the new elements illustrated in FIG. 6 and those common elements from FIG. 2.

FIG. 6 shows a permanent store 44 for a subscriber tier authorization code location. This represents the location of the unique tier authorization code for this particular subscriber within the tier authorization pages (FIG. 4).

Also shown in FIG. 6 is a subscriber tier authorization code memory 48 interconnected with microprocessor 38a, teletext page memory 36a, data acquisition circuit 34a and a tier description page memory 46. Memory 48 is effective to store the subscriber's authorization code which it receives from data acquisition circuit 34a in response to commands from microprocessor 38a based on the contents of subscriber tier authorization code store location 44.

Another feature shown in FIG. 6 is tier description page memory 46 which is interconnected with microprocessor 38a teletext page memory 36a, data acquisition circuit 34a and subscriber tier authorization code memory 48 as shown. Tier description page memory 46 is effective to receive and store the tier description page described above in conjunction with FIG. 3 when it is acquired from the cyclically transmitted data base by data acquisition circuit 34a in response to the appropriate commands from microprocessor 38a.

Figure 7:
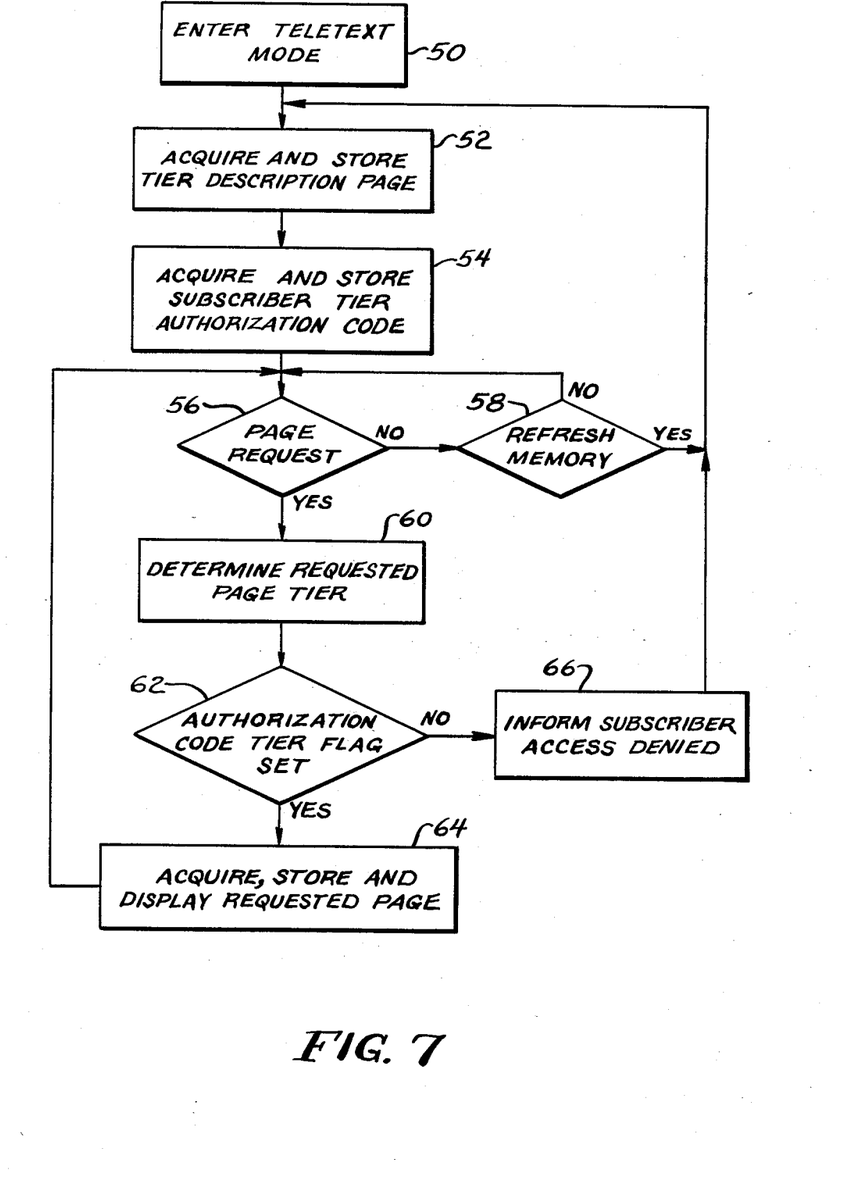
FIG. 7 is a flow chart illustrating the method of programming the microprocessor of the data decoder of FIG. 6.

The operation of this illustrative system which embodies the present invention is more easily described in conjunction with the flow chart of FIG. 7 (which illustrates also the program of microprocessor 38a of FIG. 6). This flow chart also illustrates the significant advantages of dynamic addressability for full-field teletext transmission which the present invention offers.

FIG. 7 shows a flow chart which specifies the logical progression for the controlling microprocessor 38a in FIG. 6. Initially, the microprocessor 38a is responsive to a command from the subscriber to enter the teletext reception mode. This may be done in a number of ways including simply throwing a switch. However, in the preferred embodiment this is done by an appropriate command on the keyboard 40a (FIG. 6).

Once the receiver is in the teletext mode as shown at block 50, data acquisition circuit 34a is instructed at 52 to acquire the tier description page from the cyclically transmitted data base and store it in the tier description page memory 46. While the acquisition time for this page is normally the same as any other particular page in the data base, in one embodiment of the invention the acquisition time for this page can be reduced dramatically to as little as 2 seconds by more frequent transmission of the system control pages during the normal cyclical transmission of the rest of the data base as described more fully above.

After the tier description page is stored in its memory 46, the subscriber tier authorization code is acquired at 54 by data acquisition circuit 34a and stored in subscriber tier authorization code memory 48. This is precipitated through the use of the subscriber's location number preprogrammed into memory 44 which gives the location of the subscriber's tier authorization code within the set of subscriber tier authorization code page. In one described embodiment of the invention this can be done by a series of steps governed by the digits in the subscriber's personal number. Initially, the page on which the subscriber's code is located is found. Next, the row containing the desired code is determined, and finally, attention is focused upon the appropriate customer within that row.

The acquisition time for acquiring and storing the subscriber's authorization code may be reduced in a fashion similar to that described above in conjunction with the acquisition of the tier description page. This may be done because, like the tier description page, the pages bearing the subscriber tier authorization codes can form a normal part of the cyclical transmissions.

After the tier description page and the subscriber's tier authorization code have been acquired and stored, the microprocessor 38a interrogates the keyboard 40a at diamond 56 to determine whether a page request has been received. If none has been received, the microprocessor enters a loop 58 to continually test whether tier description page memory 46 or subscriber tier authorization code memory 48 needs to be refreshed. If either of the memories needs to be refreshed, the microprocessor goes back and acquires and stores both the tier description page and the subscriber's tier authorization code again and then reinterrogates the keyboard to determine whether a page request has been received. Likewise, if the memories do not need to be refreshed, the keyboard is again interrogated to determine if a page request has been received. This cycle continues until a page request is received.

Upon receipt of a page request from the subscriber, at block 60 the microprocessor determines which tier contains the requested page. This is done by examining the tier description page in tier description page memory 46. On that page, the range of pages corresponding to any specific tier is listed as described more fully above in conjunction with the discussion of FIG. 3. To determine which tier contains the requested page, the system locates the range of pages within which the particular page number falls and notes the corresponding tier number.

At this point, the system determines whether the subscriber has paid for, or otherwise been granted, access to the program tier containing the requested page. This is done in decision diamond 62 by examining the particular bit corresponding to the requested tier within the subscriber's tier authorization code. If the bit flag is set (indicated by "yes" in FIG. 7), indicating that the subscriber is to be allowed access to the requested tier, the page originally requested is acquired, stored, and displayed by the receiver apparatus as indicated at block 64. If the bit flag is not set, indicating that the subscriber is not to be allowed access to the requested tier, the subscriber is informed of this fact at block 66 by an appropriate message, and the microprocessor loops back to the beginning and continues to go through the above described steps until an accessible page is requested.

Once the system has acquired, stored, and displayed an accessible requested page, it returns to diamond 56 to determine whether another page has been requested. Thereafter, the system behaves as was described above.

One of the features of the described full-field teletext system according to the present invention is that if a subscriber continues to request the same page for any length of time, that page will be updated so that it always stays current with the information in the teletext data base. This is because the memory refreshing function goes back and re-acquires the requested page from the cyclically transmitted data base. Thus, whatever information is in the data base will be displayed for the subscriber regardless of the time at which the subscriber originally requested the page relative to the time new information for that page was entered into the data base. This is particularly advantageous for display of rapidly changing information such as weather and temperature, stock market reports, and sports data.

However, more significant is the dynamic addressability available with this system. This allows head-end control over each of many subscribers and their access to the program tiers. Also, this is a dynamic system which can be controlled totally by the head-end computer based on updated billing information or other inputs to the head-end.

By using a respective transmitted authorization code for each subscriber, the system controller is able to differentiate among subscribers to regulate access to particular programs for any selected subscriber. However, if everyone in the system is to be granted access to a particular teletext program in the data base, it is a simple operation to change every subscriber's transmitted authorization code by flagging the appropriate bit in each one. Similarly, if a particular subscriber desires access to a new program and has been authorized to receive such access by paying the appropriate subscription fee, for example, it is an easy operation to change only that subscriber's transmitted authorization code to allow access by merely flagging the appropriate bit in the code.

It is important to note that all such changes, whether system-wide or directed toward a particular subscriber, may be effectuated without any change in the hardware at the subscriber's station. All that is required at the subscriber's station is storage for the subscriber's preprogrammed identification number which tells the microprocessor where in the tier authorization pages to look for that subscriber's tier authorization code. Once the transmitted authorization code and the transmitted tier page range are acquired, it is a relatively simple matter to determine whether the requested page falls within a tier to which that subscriber has access. The personal identification number stored at the subscriber's station need never be changed; the subscriber's tier authorization code is always at the same location defined by that number.

Even though it is a simple matter to change the subscriber's tier authorization code so as to change the tiers to which that subscriber is to be granted access, it is likewise easy to change the definition of a tier page range so as to change the level of accessibility for all subscribers.

It is to be remembered that on the tier description page, which is cyclically transmitted along with the entire teletext data base, each tier's page range is provided. Also, it should be remembered that access to a particular requested page is determined in the illustrative embodiment by finding the tier in which it is located and then interrogating the corresponding bit flag in the subscriber's tier authorization code. Because of this logical sequence, it is possible to change the level of access to a subscriber without changing any tier authorization codes. All that is required is to expand the page range of a previously authorized tier to include the newly authorized range of pages.

For example, if the system operator wishes to grant greater access to the system data base, it is only necessary to redefine a particular tier on the tier description page. Thus, if a set of subscribers is currently authorized to have access to tier 1 comprising pages 300–500 in the teletext data base, i.e. the first bit of each tier authorization code is flagged, and the system operator decides to allow that set of subscribers access to tier 2 comprising pages 500–600 in the teletext data base, the additional material may be made available to all subscribers authorized for access to tier 1 without changing the flagging status of bit 2 of any tier authorization code. By redefining tier 1 on the tier description page to contain the page range 300–600, any subscriber having access to tier 1 may access any of the newly-authorized pages 500–600 based solely on the flagged condition of the first bit of their tier authorization code.

It will be appreciated that this is beneficial when it is desired to increase the accessible data base system-wide. Thus, in a teletext system having some service level tiers accessible to every subscriber and others limited to paying subscribers, it is possible to give free samples of the special service tiers to all subscribers without costly changes in each subscriber tier authorization code. Simply redefining the page range of any tier currently accessible to all subscribers to include the to-be-sampled page range portion of the special service tiers allows systemwide access. In this fashion, a teletext system operator could engage in two or three day promotions merely by increasing a tier page range at the start and decreasing it to its original range at the end. Importantly, these modifications can be easily performed at the head-end of the system and require no hardware or software modification at the subscriber end.

Although the present invention has been described above in terms of the preferred embodiment, the scope of the invention is believed to be set out with particularity in the appended claims. It will be appreciated then that changes and modifications as would be apparent to one skilled in the art and familiar with the teachings of this application may be made without escaping the scope and spirit of the invention described herein.

What is claimed is:

1. In a teletext system having a head-end station, a group of subscriber stations, a data base comprising a multiplicity of data pages transmitted from the head-end station to the subscriber stations on a video channel, each data page comprising a group of data, said data base arranged into program service levels each comprising a respective set of pages in the data base, the data base and service levels being individually accessible to particular subscribers on a selective basis in response to subscriber requests for access to the teletext system, the improvement for controlling and adjusting subscriber access to particular service levels comprising:

means at the head-end station for transmitting to each of the subscriber stations a service level description page comprising data defining each of said service levels and a subscriber service level authorization code page comprising a group of subscriber service level authorization codes for plural subscribers, each of said authorization codes specifying the service levels to which a corresponding subscriber is entitled to have access; and a respective logic circuit located at each subscriber station responsive to said description page and said authorization page for controlling access at its subscriber station to service levels on the basis of the authorization code corresponding to such subscriber station and the service level corresponding to the request by the subscriber.

2. The improvement of claim 1 including means for receiving a request from a subscriber for access to a certain page in the data base, and wherein each of said logic circuits includes:

means for determining which of said service levels contains said requested page by comparing said requested page with the currently defined range of each service level on said service level description page.

3. The improvement of claim 1 wherein said means for transmitting further is operable for altering the definition of said service levels.

4. The improvement of claim 1 wherein each logic circuit includes:

means for acquiring and storing said service level description page.

5. The improvement of claim 1 wherein said service level authorization code page includes a group of authorization codes and wherein each of said logic circuits includes:

means for locating said service level authorization code for the corresponding subscriber station on said service level authorization code page; and means for storing said subscriber's service level authorization code.

6. The improvement of claim 5 wherein said means for locating includes:

means for storing data uniquely associated with said subscriber station; and means for locating said subscriber's service level authorization code responsive to said means for storing.

7. The improvement of claim 1 wherein said service level authorization code is transmitted on one of a multiplicity of subscriber service level authorization code pages, wherein each of said logic circuits includes:

a data acquisition circuit for locating said page containing said subscriber station's service level authorization code and for locating said subscriber station's service level authorization code on said page; and means for storing said service level authorization code.

8. The improvement of claim 7 wherein each of said logic circuits includes:

means for storing data uniquely associated with said subscriber station; and means responsive to said means for storing data for locating said service level authorization code in said subscriber code page.

9. The improvement of claim 1 wherein each of said respective logic circuits comprises:

a data acquisition circuit, a data processor, and memory means for storing (1) an authorization code pointer, (2) said service level description page, and (3) a subscriber service level authorization code, said data processor communicating with said memory means and said data acquisition circuit, and cooperating therewith for receiving said service level description page and storing it in said memory means for receiving said authorization code page and for storing in said memory means the authorization code assigned to the corresponding subscriber station based on said pointer; and an input device coupled to said data processor, said processor responding to said input device for determining whether a request entered via said input device corresponds to a service level which said subscriber station is authorized to decode.

10. In a teletext system having a head-end station, a plurality of subscriber receiving stations, a data base comprising a multiplicity of pages cyclically transmitted from the head-end station to said subscriber stations on a video channel, said data base being arranged into a group of service levels each comprising a set of pages in said data base, a method for controlling access to said service levels upon request from a particular subscriber station including:

transmitting to each subscriber station data comprising a description page defining a range of pages in said data base for each of said service levels;

transmitting to each subscriber station data comprising a subscriber service level authorization code page containing service level authorization codes for each of plural subscribers, each of said authorization codes being representative of said service levels to which the corresponding subscriber stations is authorized to have access;

determining at said subscriber station the identity of the service level to which said subscriber station requests access by examining said service level description page; and determining whether said subscriber station is to have access to said determined service level by examining said subscriber's service level authorization code.

11. The method of claim 10 further comprising:

displaying said requested page if said subscriber is authorized to have access to said determined service level containing said requested page; and informing said subscriber of access denial if said subscriber is not authorized to have access to said determined service level containing said requested page.

12. The method of claim 10 wherein each of said subscriber stations includes a respective control device and wherein said step of determining to which service level said subscriber has requested access comprises:

interrogating said control device to determine which page number of said data base has been requested; and comparing said requested page number with the defined page ranges for each service level as described on said service level description page to determine the range corresponding to said requested page number and the corresponding service level.

13. The method of claim 10 further comprising:

storing at each subscriber station a respective pointer; and using said pointer to locate said subscriber's service level authorization code on said subscriber service level authorization code page.

14. The method of claim 10 further comprising:

acquiring and storing said service level description page when said subscriber requests access to said teletext data base; and acquiring and storing said subscriber's service level authorization code when said subscriber requests access to said teletext data base.

15. The method of claim 10 further comprising altering the defined range of pages for a selected service level thereby changing the number of pages accessible by all subscribers without changing all service level authorization codes.

16. In a teletext system having a cyclically transmitted, service level-subdivided data base, the method comprising:
- transmitting to plural subscriber stations service level descriptions which define the portion of said data base allotted to each of said service level subdivisions;
- transmitting to said subscriber stations a group of authorization codes each containing data representing a corresponding subscriber's access to each of said service level subdivisions; and
- dynamically controlling the access of all subscriber stations to the data base by adjusting the defined range of said service level subdivisions.

17. The method of claim 16 wherein said step of adjusting the defined range of said service level subdivisions selectively comprises:
- expanding a defined range of said service level subdivisions to which subscribers are currently authorized to have access to include a newly authorized portion of said data base; and
- reducing a defined range of said service level subdivisions to which subscribers are currently authorized to have access to exclude said portion of said data base to which subscribers are no longer to have access.

18. In a teletext system, a method for altering the access to particular portions of a data base for system subscribers comprising:
- transmitting via a communication link a data base divided into service levels from a head-end station to various subscribers;
- transmitting via said link service level descriptions which define the portion of said data base allotted to each of said service level subdivisions from said head-end station to the subscribers;
- transmitting via said link to the subscribers a group of subscriber service level authorization codes which contain data representative of each subscriber's access to said service level subdivisions, said service level descriptions and authorization codes being used at each subscriber station to determine access thereat to service levels of said date base; and
- changing a service level description at said head-end station and transmitting it to said subscribers to alter access to said data base by said subscribers.

19. A decoder for a teletext system having a head-end station, a data base arranged in a multiplicity of data pages, each data page comprising a group of data, said pages being grouped into program service levels each comprising a respective set of data pages, the head-end station communicating the data base to said decoder via a video channel, wherein said decoder includes:
- a data processor communicating with (1) a data acquisition circuit, (2) a data input device, and memory means for storing an authorization code and (3) a service level description page, said data processor being responsive to a request entered by said data input device for access to a particular page within said data base, said data processor being arranged for acquiring via said video channel and storing within said memory means a subscriber service level authorization code transmitted to said decoder by said head-end station within a transmitted service level authorization code page, said data processor being operable further for acquiring and storing in said memory means a service level description page transmitted from said head-end station to said decoder via said video channel, said data processor being operable for determining the service level corresponding to the requested page of said data base by consulting said memory means, for determining whether said service level is authorized by comparison with said authorization code stored in said memory means, and for determining whether said decoder is authorized to decode said page.

20. A method of controlling access to a data base in a teletext system having a head-end station communicating with a group of subscriber stations via a video channel, the data base being arranged in a plurality of data pages each comprising a group of data, the data base being arranged into plural service levels each comprising a respective set of pages in the data base, comprising the steps of:
- transmitting from said head-end station via said video channel to each of said subscriber stations a service level description page comprising data defining each of said service levels;
- storing said service level description page at each of said subscriber stations;
- transmitting from said head-end station via said channel to each of said subscriber stations an authorization code page comprising respective data for each of corresponding plural subscribers specifying the service levels to which said corresponding subscribers are entitled to have access;
- storing a respective authorization code at each subscriber station requesting access to the data base;
- determining at a subscriber station the page to which the corresponding subscriber requests access in said data base;
- determining the service level of the requested page from the data base by consulting said stored service level description page;
- and determining at the subscriber station whether said determined service level is authorized on the basis of said authorization code.

21. The method of claim 20 wherein the method includes:
- storing a respective pointer at each of said subscriber stations;
- locating a subscriber authorization code from within said authorization code page on the basis of said pointer; and
- storing said subscriber authorization code.

* * * * *